Feb. 18, 1930.         F. J. FLAHERTY         1,747,894
                    AIR VALVE FOR PIPE ORGANS
                    Original Filed July 26, 1926

Inventor:
Frederick J. Flaherty.
by Hughes Brown Quinby May
Attys.

Patented Feb. 18, 1930

1,747,894

UNITED STATES PATENT OFFICE

FREDERICK J. FLAHERTY, OF WOODSTOCK VALLEY, CONNECTICUT, ASSIGNOR TO JENNIE A. FLAHERTY, OF WILLIMANTIC, CONNECTICUT

AIR VALVE FOR PIPE ORGANS

Original application filed July 26, 1926, Serial No. 124,797. Divided and this application filed April 19, 1927. Serial No. 184,930.

This application is a division of my application Serial No. 124,797, filed July 26, 1926.

The invention relates to air-valves especially adapted for use with individual pipes of a pipe organ. An object of my invention is to simplify pipe-organ construction and repair by providing a separate valve, a complete unit in itself, for each individual pipe. By my invention, the ceiling of a wind chest may be bored at any point for an organ pipe, the holes thus being capable of being spaced as desired according to the size of the pipes. This prevents the crowding of the larger pipes and undue spacing of the smaller pipes which is occasioned by the use of banks or series of equally spaced pipe valves.

My invention further relates to a valve having a structure which makes it particularly suitable for use with the larger pipes of an organ which require comparatively large quantities of air to make them speak. It is an object of my invention to make possible a uniformly prompt response on the part of pipes of all sizes when the corresponding keys are depressed. The hiatus between the pressing of a key and the response of the larger bass pipes, which is often very noticeable in many organs, limits the tempo of the music which can be played on such an instrument and is a source of constant annoyance to the musician. My construction and arrangement of valves is such that pipes of all sizes respond with equal promptness.

Further advantageous features and combinations will be apparent to one skilled in the art from the following description of the apparatus as illustrated on the drawings, of which,—

Figure 1 is a plan view of one form of air valve embodying my invention, this form being particularly suitable for use with large pipes.

Figures 2, 3 and 4 are sections on the lines 2—2, 3—3 and 4—4 of Figure 1.

Figure 7:
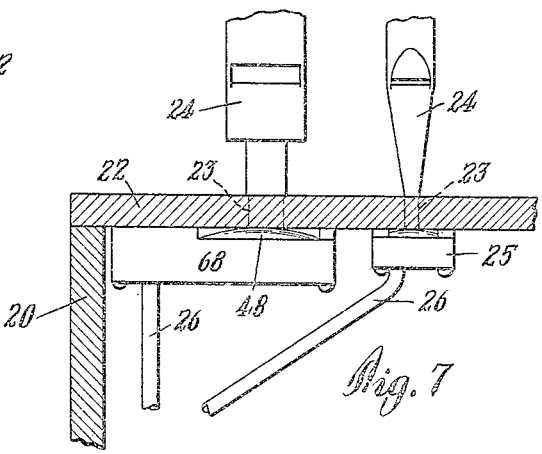
Figure 7 is a fragmentary section of a wind chest, showing how the valves illustrated in the other figures may be installed.

Referring to Figure 7, 20 represents a portion of the wind chest of a standard pipe organ which is filled with air at a suitable pressure greater than atmospheric during the operation of the organ. The top member or ceiling 22 of the wind chest is perforated, each perforation 23 being adapted to receive the end of a speaking pipe 24, the perforations being each of a suitable size to supply the correct amount of air to the pipe which is fitted thereover. Each perforation 23 is normally closed by an individual valve 25 which is connected for operation by a flexible tube 26 with a suitable valve mechanism, controlled by the appropriate stops and keys in any preferred manner, by which the pressure in the tube 26 is atmospheric or wind-chest pressure according to the actuation of the control means.

Figure 1:
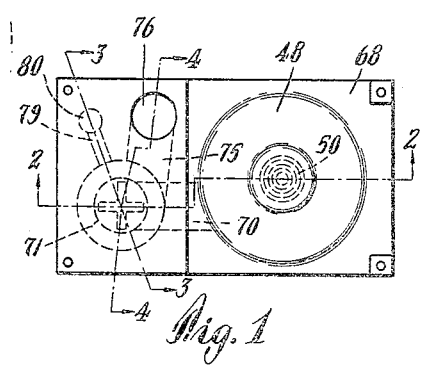
Figure 2:
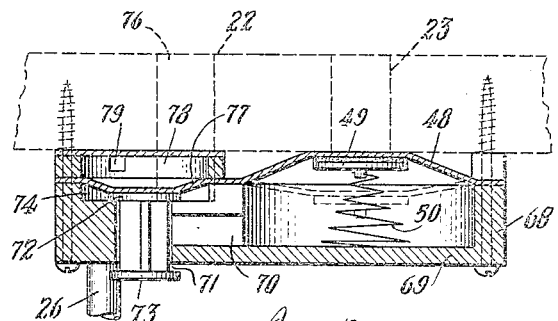
Figure 3:
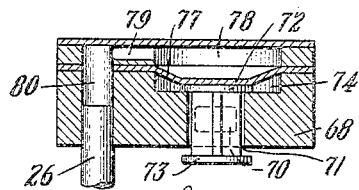
Figure 4:
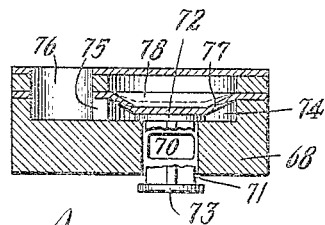
Figure 5:
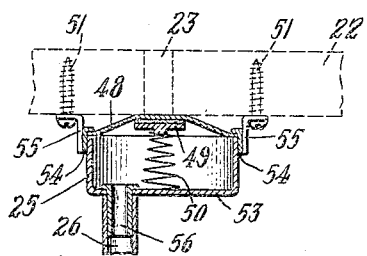
Figures 5 and 6 are sections of a simpler type of valve embodying my invention, this type being suitable for use with smaller pipes.
Figure 6:
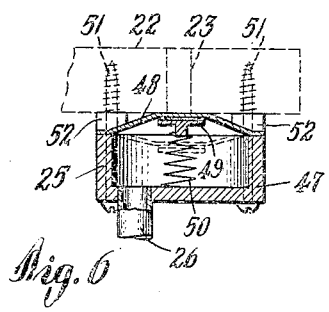

In Figures 5 and 6 are illustrated individual valves of a simple but efficient type, which are especially suited for use with medium or small sized pipes. They are capable of giving excellent service also with the larger sizes of pipes, but for such pipes the valve illustrated in Figures 1 to 4 is to be preferred as hereinafter set forth.

The valve 25 (Figures 5 and 6) comprises a box 47 over the top of which is pasted or otherwise secured a thin flexible membrane or diaphragm 48. The box 47 is preferably formed of a wooden block having a circular hole bored therein. Concentrically disposed with respect to the circular hole is a light disk 49 which may be of felt or equivalent material preferably stiffened with a backing of cardboard or the like, and which is secured to the membrane 48 and against which may press a light spring 50, the other end of which rests on the floor of the box 47. The box 47 is secured to the under side of the top or ceiling 22 of the wind chest as by pins or screws 51 which pass upwardly through the side walls of the box and through small spacing blocks 52 which hold the upper surface of the box 47 spaced from the ceiling 22 to permit free access of the wind in the chest to the upper surface of the membrane 48. Each box 47 is so disposed that the central portion of the membrane 48 which is backed by the disk 49 will be pressed against the opening 23 which communicates with the organ pipe 24. A small hole is bored in the bottom of each box 47 which communicates with one of the tubes 26. The pressure within the box 47 is normally equal to the pressure in the wind chest, so that the spring 50 holds the disk 49 and the central portion of the membrane 48 against the opening 23 and thus prevents the pipe 24 from speaking. When, however, the pressure in the box 47 is reduced to atmospheric through the tube 26, the wind pressure in the chest acting on the upper surface of the membrane 48 depresses the disk 49 against the light pressure of the spring 50 and rushes upwardly through the perforation 23 into the pipe 24. The pipe thus speaks until wind pressure is introduced through the tube 26 into the box 47. This balances from below the chest pressure on the upper surface of the membrane 48 and allows the spring 50 to close the passage 23. Instead of using a spring 50 to aid the pressure within the box in making the forces against the inner face of the membrane 48 greater than those on the outer face, and thus to hold the membrane over the opening 23 when chest pressure is in the box 47, I may bring about the difference of forces by other means, as, for example, by introducing into the box 47 wind pressure greater than chest pressure, in which case the spring 50 could be dispensed with. The location of the stiffening disk 49 below the membrane 48 enables the latter to present a smooth surface to the air currents rushing into the passage 23. Eddy currents at the lower opening of the passage 23 are thus avoided, and the pipe speaks more promptly and evenly as a result. Figure 5 shows an individual valve equivalent to that shown in Figure 6, but constructed chiefly of sheet metal. As shown, a circular box 53 may be stamped from a sheet and the membrane 48 secured to the top thereof as by a clamping ring 54. Suitable brackets 55 may be employed to support the box in suitable spaced relation from the ceiling 22. A nipple 56 may be secured in the bottom of the box 53 to facilitate the connection thereof with the tube 26. The use of the flexible tubes 26 and the individual pipe valves 25 permits great freedom in the location of the individual organ pipes and also facilitates the repair or replacement of defective valves 25.

The larger bass pipes of an organ such as the 16-foot and 32-foot pipes require a relatively large volume of air to speak properly. This necessitates a valve of such size that an appreciable interval of time would be required to allow the box 47 to exhaust through the usual size of the tube 26, which is commonly employed. In order to prevent such possibility of slight delays in the speaking of the larger pipes, I provide a relay valve 68 which is illustrated in detail in Figures 1 to 4. A box 69 similar to the box 47, but larger in size, may contain a spring 50 supporting a disk 49 secured to the underface of a membrane 48 which extends over the top of the box 69, the portion of the membrane 48 which is backed by the disk 49 being positioned to register with the passage 23 which leads to the pipe. A relatively large passage 70 connects the inside of the box 69 with a vertical passage 71 in which is fitted a compound valve 72, 73. This valve when in its lower position connects the inside of the box 69 with the wind chest through the passage 71. When the valve is raised, the interior of the box 69 is connected through the passage 71 with a chamber 74 which communicates to the open air by suitable passages 75, 76 of relatively large cross section. Thus when the valve 72, 73 is raised, the pressure in the box 69 is quickly dropped to atmospheric through a system of relatively large passages. The action of the valve 72, 73 is controlled by a thin flexible diaphragm or membrane 77 which extends between chamber 74 and upper chamber 78. The latter is connected as by suitable passages 79 and 80 to a tube 26, which is of standard size. When the pipe is silent, wind chest pressure is in the tube 26 and therefore in the chamber 78. This pressure acts upon the compound valve 72, 73 to hold it in its lower position so that the chest pressure is communicated from below to the passage 71 into the interior of the box 69, thereby cooperating with the spring 50 to hold the disk 49 over the end of the passage 23. When a key is depressed, which results in a reduction of pressure in the tube 26 to atmospheric, the pressure in the chamber 78 is at once reduced, permitting the chest pressure to act on the disk 73 to elevate the valve 72, 73. This at once cuts off the interior of the box 69 from the wind chest and opens a large exhaust passage for the quick reduction of the pressure in the box 69 to atmospheric. The pipe therefore speaks as promptly as those having small valves.

This valve structure which enables the proper operation of the larger pipes through tubes 26 of standard size permits unlimited freedom in the placing of the pipes over the ceiling of the wind chest in any relative positions desired. This prevents the crowding together of the larger pipes and the undesirably wide spacing of the smaller pipes which is necessitated by most of the present methods of organ construction.

Having thus described an embodiment of my invention, it should be evident to those skilled in the art that many changes and modifications may be made therein without departing from its spirit or scope as defined by the appended claims.

I claim:—

1. As a separate article of manufacture, an individual organ pipe valve comprising a box having an air duct through a wall thereof, a flexible diaphragm extending across the top of said box, and a stiffening member secured to the central portion of said diaphragm and on the inner surface thereof.

2. As a separate article of manufacture, an individual organ pipe valve comprising a box having an air duct through a wall thereof, a flexible substantially air-tight diaphragm extending across the top of said box, a stiffening member secured to the central portion of said diaphragm and on the inner surface thereof, and a compression spring disposed between the bottom of the box and said stiffening member.

3. As a separate article of manufacture, an individual organ pipe valve comprising a box having an air duct through a wall thereof, a flexible substantially air-tight diaphragm extending across the top of said box, a supply and exhaust valve connected to said duct, and pneumatically actuable means for operating said supply and exhaust valve.

4. As a separate article of manufacture, an individual organ pipe valve comprising a box having a chamber therein and a branching duct leading from said chamber to supply and exhaust ports, a flexible diaphragm closing the top of said chamber, a subsidiary valve in said duct actuable to connect said chamber selectively with said supply or exhaust port, and pneumatically operable means for controlling said subsidiary valve.

5. An individual organ pipe valve comprising a box having an air duct through a wall thereof, a flexible substantially air-tight diaphragm extending across the top of said box, a stiffening member secured to the central portion of said diaphragm and on the inner surface thereof, a compression spring disposed between the bottom of the box and said stiffening member, a supply and exhaust valve connected to said duct, and pneumatically actuable means for operating said valve.

6. An individual organ pipe valve comprising a box having two closed chambers therein and a two-way passage connecting one chamber with the other and with the outside of the box, the first said chamber having a flexible substantially air-tight diaphragm on the top thereof, a stiffening member secured to the central portion of said diaphragm and on the inner surface thereof, a spring disposed between said stiffening member and the bottom of said first chamber, a flexible diaphragm passing across the middle of said second chamber, and valve means attached thereto for closing off either branch of said two-way passage, said box also having passages from the outside thereof entering the second said chamber above and below the diaphragm therein.

7. As a separate article of manufacture, an individual organ pipe valve comprising a box having a chamber therein, inlet and exhaust ports, and a relatively large short air passage connecting said chamber with said ports, a subsidiary valve in said passage actuable to connect said chamber selectively with said supply or exhaust port, and pneumatically operable means having a relatively small air connection for controlling said subsidiary valve.

8. In a pipe organ wind chest having a hole in the ceiling thereof to receive an organ pipe, a separate individual valve comprising a box with rigid sides and bottom, a flexible diaphragm constituting the top of the box, and means supporting the valve solely from the ceiling of the chest with the box spaced from the ceiling and the central portion of the diaphragm normally covering said hole in the ceiling, and an air pipe communicating with said box to control the action of the valve.

9. In a pipe organ wind chest having two holes through the ceiling thereof, one of said holes being adapted to receive an organ pipe and the other being an exhaust vent, an individual organ pipe valve secured to said ceiling beneath said holes, said valve comprising a box having a chamber therein, a flexible diaphragm over said chamber, the central portion of the diaphragm being arranged normally to cover the pipe receiving hole in said chest ceiling, said box having also a port opening into the wind chest, another port registering with said exhaust vent, and a relatively large short passage connecting said chamber with said ports, a subsidiary valve operable to connect said passage selectively with said chest port or exhaust port, pneumatically operable means for controlling said subsidiary valve, and a relatively small air connection for actuating said control means.

In testimony whereof I have affixed my signature.

FREDERICK J. FLAHERTY.